United States Patent
Davies

[15] 3,653,763
[45] Apr. 4, 1972

[54] APPARATUS FOR THE MEASUREMENT OF ULTRA-VIOLET, VISIBLE AND/OR INFRA-RED RADIATION

[72] Inventor: Arthur Gordon Davies, London, England

[73] Assignee: Medical and Electrical Instrumentation Company, London, England

[22] Filed: May 4, 1970

[21] Appl. No.: 34,344

[30] Foreign Application Priority Data

May 5, 1969 Great Britain......................22,882/69

[52] U.S. Cl..................................356/51, 250/207, 356/74, 356/186, 356/202
[51] Int. Cl..................G01n 21/34, G01j 3/00, G01n 21/06
[58] Field of Search.....................356/51, 186, 188, 189, 202; 250/207, 202

[56] References Cited

UNITED STATES PATENTS

| | | | |
|---|---|---|---|
| 2,971,433 | 2/1961 | Akin | 250/207 |
| 3,130,316 | 4/1964 | Townsend | 250/207 |
| 3,528,749 | 9/1970 | Bowker | 356/202 |

Primary Examiner—Ronald L. Wibert
Assistant Examiner—V. P. McGraw
Attorney—Mawhinney and Mawhinney

[57] ABSTRACT

A radiation measuring device for ultra-violet, visible or infrared radiation, particularly suitable for use in a color analyser for photographic printing has a photomultiplier tube with a current sensing resistor in the anode circuit. The voltage across this resistor is used to control the amplitude of oscillation of an oscillator which, via a step-up transformer and rectifier circuit, provides E.H.T. for the tube. The E.H.T. voltage is thus controlled to maintain the anode current sensibly constant. The controlled E.H.T. voltage also is applied to the bleeder resistor chain for the dynodes of the photomultiplier tube, which resistor chain, with a series measuring resistor, forms a potential divider; the voltage across the measuring resistor is proportional to the logarithm of the light intensity and a temperature compensated correction circuit is provided to improve the linearity of this relationship. The voltage across the measuring resistor is applied to one input of a differential voltage measuring circuit having, in the case of a color analyzer, a second input from potential sources switched in synchronism with the color filter selection.

11 Claims, 4 Drawing Figures

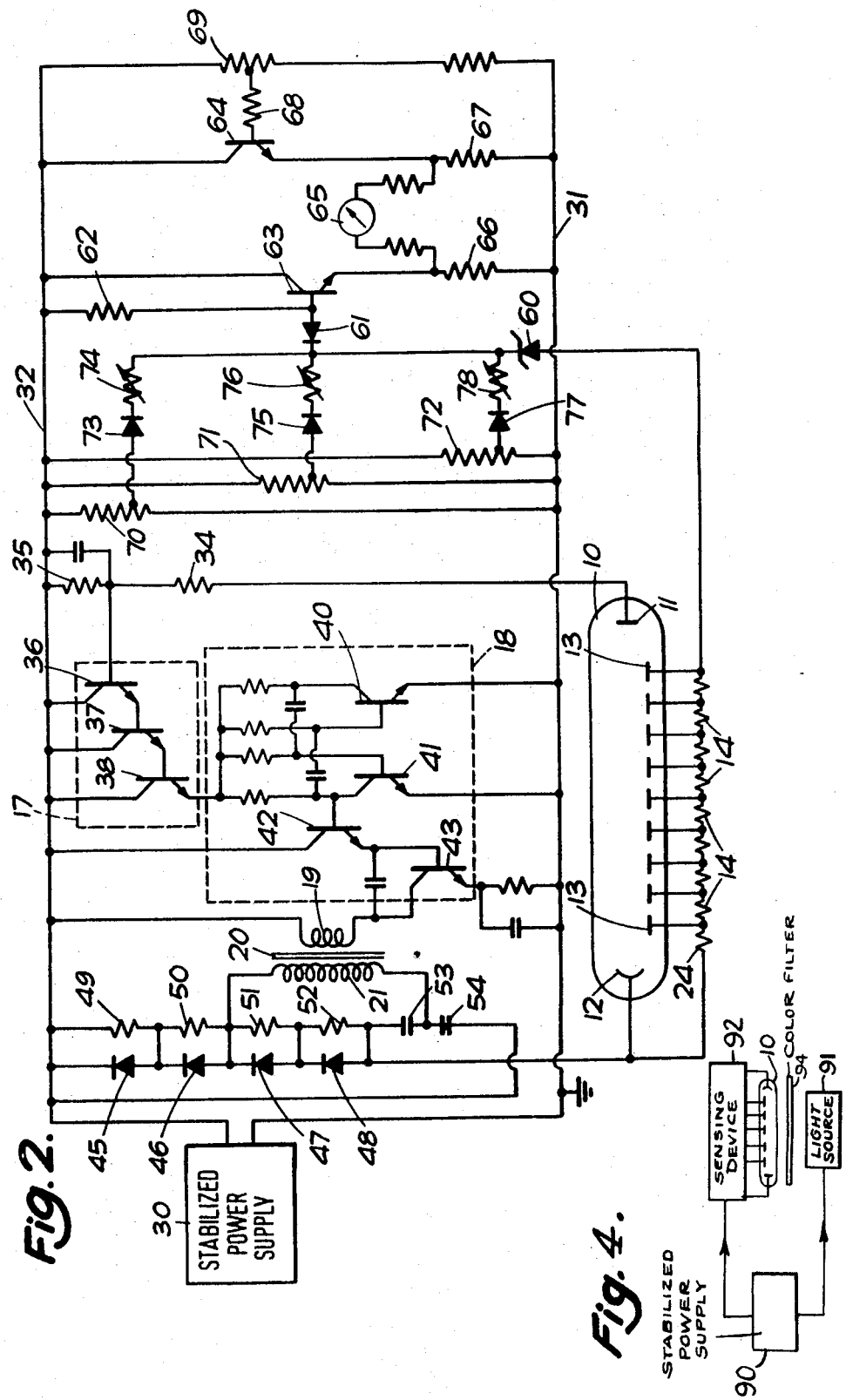

APPARATUS FOR THE MEASUREMENT OF ULTRA-VIOLET, VISIBLE AND/OR INFRA-RED RADIATION

BACKGROUND OF THE INVENTION

1. Field of the Invention.

This invention relates to apparatus for the measurement of ultra-violet, visible and/or infra-red radiation.

2. Description of the Prior Art.

It is often required to measure the intensity of radiation, e.g., in spectrophotometers, densitometers, color analysers, exposure meters and scintillation counters. For many purposes, results are expressed in terms related to optical density which is the logarithm of the reciprocal of the transmissivity and for this reason it is desirable to have an output display with a linear scale representative of the logarithm of the measured radiation. Use commonly has been made of a photomultiplier tube as the light sensing device, the photomultiplier tube having a chain of bleeder resistors connected to the various dynodes which chain, with a further resistor is connected in series with a control tube, usually a pentode tube. The grid of the control tube is connected to the anode of the photomultiplier tube. A constant E.H.T. voltage is applied between the anode of the control tube and the cathode of the photomultiplier tube. With such an arrangement, as the light intensity increases, the anode current of the photomultiplier tube tends to increase, so reducing the grid potential of the control tube. The current through the bleeder resistors is reduced so that dynode voltage and thereby the sensitivity of the tube is reduced. With a high gain control tube, the anode current is maintained substantially constant. With a typical photomultiplier tube, the dynode voltage in such an arrangement is, to a reasonably close approximation, linearly proportional to the logarithm of the sensitivity.

The photomultiplier tube will typically require a voltage of over 1 kv. and the practice has been to control the current through the photomultiplier tube by means of a control tube with a series resistor. One such arrangement is described by Sweet in Electronics Nov. 1946 pages 105–109 and a number of variations and developments of this equipment have been made since then. However such equipment is heavy and bulky and has a high power consumption. Moreover, control tubes such as are used in this equipment have a limited life. It is not possible however to use a transistor or other three-terminal semiconductor device instead of the control tube as a constant current supply source for the photomultiplier tube because of the very high potential for the photomultiplier tube.

SUMMARY OF THE INVENTION

It is an object of the present invention to provide an improved form of radiation sensing device responsive to ultra-violet, visible or infra-red radiation making use of a photomultiplier tube to give an outward indication approximately linearly proportional to logarithm of the radiation intensity and which, apart from the photomultiplier tube, can employ solid state devices.

According to this invention a radiation sensing device responsive to ultra-violet, visible or infra-red radiation comprises a photomultiplier tube having an anode, a cathode and dynodes with a bleeder resistor chain across the dynodes, an E.H.T. supply means applying an E.H.T. voltage between the anode and cathode and also across the bleeder resistor chain, said E.H.T. supply means including a step-up transformer and a rectifier, an oscillator unit applying alternating current to the transformer, means responsive to the anode current of the photomultiplier tube arranged to control the amplitude of the output of the oscillator unit so that the E.H.T. voltage is decreased as the anode current tends to increase so as to maintain the anode current substantially constant and indicator means responsive to the E.H.T. voltage. By this arrangement using an oscillator and a step-up transformer so that the overall E.H.T. voltage is varied to keep the anode current substantially constant, the oscillator unit can be a low voltage device which may readily be constructed using three-terminal semi-conductor devices such as transistors. The oscillator unit may include an oscillator of any suitable type, for example a Hartley or a Colpitts circuit may be used or a multivibrator circuit. The oscillator may feed the transformer directly or through a buffer amplifier and/or via power amplifier transistors. A single output oscillator may be employed or a push-pull arrangement.

The aforementioned means responsive to the anode current of the multiplier tube may comprise a resistor in series with the anode and an amplifier responsive to the voltage across said resistor to provide a d.c. supply for the oscillator unit whereby the oscillator unit output voltage depends on the amplifier input. This amplifier may for example be a Darlington pair or multiple or may be an operational amplifier constructed as a discrete component unit or as a thick film or monolithic unit.

The step-up transformer and rectifier may be a simple half wave rectifier system employing a single rectifier and a smoothing condenser but more complex arrangements, including voltage doublers or multipliers may be employed.

The output indication may be obtained by measuring the current through the bleeder resistor chain; this current is proportional to the E.H.T. (and to the dynode voltage). For this purpose, a current measuring device may be connected in series with the bleeder resistor chain at the low voltage end thereof. As will be explained later, however, it is desirable to be able to set the datum for the indication to an adjustable level and it is preferred therefore to use a voltage measuring device which can be connected to measure the voltage to an adjustable datum level. The anode itself may be at or near earth potential and the cathode at a large negative potential. Because of the high potential, this voltage is preferably measured using a potential divider circuit with the meter connected to measure the voltage across a resistor at or near the end of this circuit which is at a low potential with respect to earth. The bleeder resistor chain is conveniently used as part of this potential divider circuit, a further resistor being connected in series and the voltage across this being used as a measure of the applied E.H.T. voltage.

In a preferred construction, said indicator means comprises an indicator responsive to the voltage across a measuring resistor in a potential divider circuit including the dynode bleeder resistor chain.

Preferably there are provided two or more rectifiers, each with a series resistor, connected to separate adjustable potential sources, each rectifier being arranged to by-pass part of the current through said measuring resistor in the potential divider circuit when the potential across the measuring resistor reaches that of the adjustable potential source to improve the linearity of the relationship between the logarithm of intensity and the indicated voltage, and there is provided a further rectifier in said potential divider circuit between said measuring resistor and the by-pass circuits. The provision of the further rectifier compensates for the changes in indication due to the temperature effects of the rectifiers in the by-pass circuits.

It is preferred to employ a differential voltage measuring device having one input to which is applied the voltage across the aforementioned measuring resistor in the potential divider circuit and a second input from an adjustable potential divider. This potential divider may then be set so that the indicator reads zero at the maximum light intensity or to preset the meter to some arbitrary reference reading.

The radiation sensing device described above finds particular application in a color analyser. Such a device may have a number of separate light filters which may be switchably placed in the path of the light radiation reaching the photomultiplier tube and, in such an arrangement, there may be provided a plurality of adjustable potential dividers which can be switchably connected to the second input of the indicator by a switch synchronised with the switching of the light filters thus providing appropriate zeros to be used which have been preset for the different colors.

The invention furthermore includes within its scope a densitometer including a radiation sensing device as described above in combination with a light source. Such a densitometer finds use, for example, in measuring the optical density of a photographic negative.

BRIEF DESCRIPTION OF THE DRAWINGS

FIG. 2 is a circuit diagram illustrating further details of the device of FIG. 1;

FIG. 4 is a diagram illustrating a color analyser.

DESCRIPTION OF THE PREFERRED EMBODIMENT

Figure 1:
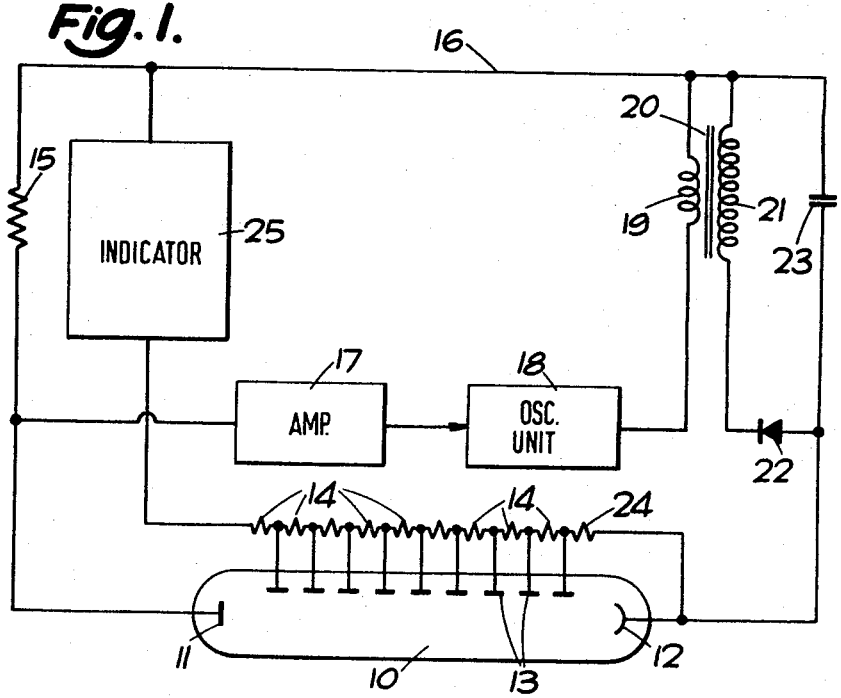
FIG. 1 is a diagram, partly of block form, illustrating a radiation sensing device forming part of a color analyser for photographic printing of color pictures.

Referring to FIG. 1 there is shown a photomultiplier tube 10 having an anode 11, cathode 12 and a plurality of dynodes 13 connected by bleed resistors 14. In series with the anode is a resistor 15, for sensing the anode current, connected to a low voltage supply line 16 which, as hereinafter explained, forms one side of the E.H.T. supply for the photomultiplier tube 10. When this tube draws anode current through the resistor 15, a voltage is developed across this resistor 15 dependent on the amount of the anode current and hence dependent on the incident radiation. This voltage is amplified in an amplifier 17, the output of which controls the amplitude of oscillation of an oscillator unit 18. Conveniently, this is done by utilising the output voltage from the amplifier 17 as the supply voltage for the oscillator unit. The arrangement is such that the output of the oscillator unit increases with decrease of radiation received by the photomultiplier tube 10. The alternating output of the oscillator is applied to a primary winding 19 of a step-up transformer 20 having a secondary winding 21. This secondary winding is connected in a half-wave rectifier circuit having a rectifier 22 and a filter capacitor 23 to provide a smoothed E.H.T. supply for the photomultiplier tube 10. In this particular arrangement, the E.H.T. supply is a negative voltage with respect to ground and is applied to the cathode 12 of the photomultiplier tube 10. This cathode 12 is connected via a resistor 24 to the chain of bleed resistors 14 across the dynodes. The dynode voltage per stage is that proportional to the applied E.H.T. voltage and is measured by an indicator 25 which may be a current measuring device in series with the bleed resistor chain but preferably comprises a measuring resistor in series with this bleed resistor chain and a voltage measuring device responsive to the voltage across the measuring resistor. The dynode voltage per stage of a photomultiplier tube (which in the present case is proportional to the E.H.T. voltage applied between the anode and cathode) will change with changes in incident radiation, the change being nearly uniformly proportional to changes in the logarithm of the light intensity. There is some non-linearity and, as will be described with reference to FIG. 2, a correction circuit may be provided to correct for the non-linearity in this response.

The apparatus is conveniently constructed with the photomultiplier tube in a probe unit connected by a flexible connector to the remainder of the apparatus.

FIG. 2 illustrates in further detail the circuit arrangement of the radiation sensing device of FIG. 1.

Referring to FIG. 2 there is shown a stabilised power supply 30 providing a low voltage stabilised d.c. supply between an earth line 31 and a positive supply line 32. The photomultiplier tube 10 has its anode connected via resistors 34 and 35 to the aforementioned line 32. The potential across the resistor 35 is applied to the amplifier 17 which is formed by three transistors 36, 37 and 38 in a triple Darlington configuration. The d.c. output voltage from this amplifier 17 is employed as a supply voltage for the oscillator unit 18 which is formed by two transistors 40, 41 arranged in a multivibrator circuit. The output of the multivibrator is applied to a transistor 42 forming a buffer amplifier feeding a power output transistor 43. The output from this transistor 43 is applied to the primary 19 winding of the step-up transformer 20. In FIG. 2, a voltage doubler circuit is employed. One end of the secondary winding 21 of the transformer 20 is connected to a tap in a rectifier chain formed by four rectifiers 45, 46, 47 and 48 connected between the line 32 and the cathode 12 of the photomultiplier tube 10. These rectifiers are shunted respectively by resistors 49, 50, 51 and 52. The second end of the secondary winding 21 of the transformer is connected to the junction between two smoothing capacitors 53, 54, the second pole of capacitor 53 being connected to the cathode end of the aforementioned rectifier chain 45–48 and the second pole of capacitor 54 being connected to the line 32.

The amplifier 17 provides an impedance matching between the anode resistor 35 of the photomultiplier tube and the control terminal of the oscillator unit 18. The anode load resistor 35 has a magnitude of the order of kilo ohms to megohms, depending on the requirements of the photomultiplier tube, whereas the control terminal of the oscillator unit 18 represents a very much lower impedance. Although a single ended oscillator with buffer amplifier and power output is shown, in some cases it may be preferred to use a push-pull configuration in order to simplify the design of the step-up transformer 20 or to reduce the regulation requirements of the power supply unit. Although in the circuit illustrated in FIG. 1, the transformer is shown with a half-wave rectifier system and FIG. 2 shows a voltage doubler circuit, other arrangements may be employed, for example a voltage multiplier circuit giving a higher multiplication factor.

The cathode 12 of the photomultiplier tube 10 is at a high negative potential with respect to earth and is connected via resistor 23 to one end of the chain of bleeder resistors 14 across the dynodes of the photomultiplier tube. The other end of this chain is connected via a Zener diode 60 or a resistor, a diode 61 and a measuring resistor 62 to the aforementioned line 32. A portion of the total E.H.T. voltage across the photomultiplier tube 10 thus appears across the resistor 62 and this is fed to the base of a transistor 63 forming one of a pair of transistors 63, 64 (or a plurality thereof) with a measuring indicator 65 connected between the emitters of these two transistors to constitute a differential voltage measuring circuit. The indicator may be an analogue or digital indicator. The collectors of the two transistors 63, 64 are connected to line 32 and the emitters are connected via resistors 66, 67 to the earth line 31. The base of the transistor 64 is connected via a resistor 68 to a tap on an adjustable potentiometer 69 connected between the lines 31 and 32. This adjustable potentiometer 69 enables the meter 65 to be set to zero for example at maximum light encountered or alternatively enables the meter to be preset to any arbitrary reference reading.

In order to improve the linearity of the relationship between the logarithm of light intensity and the meter reading, there is provided a linearising or function generator circuit, consisting of a number of set point potentiometers of which three are shown at 70, 71 and 72. The tap on potentiometer 70 is connected via a diode 73 and adjustable resistor 74 to the junction between the aforementioned Zener diode 60 and the rectifier 61. Similarly the tap on the potentiometer 71 is connected via a diode 75 and adjustable resistor 76 to this point and the tap on potentiometer 72 is connected via a diode 77 and adjustable resistor 78 in this point. These diodes 73, 75 and 77 and adjustable resistors 74, 76, 78 provide by-pass circuits which become conductive when the potential across the measuring resistor 62 and rectifier 61 reach predetermined values set by the potentiometers 70, 71, 72 and, when conductive, by-pass predetermined amounts of current from the measuring resistor 62. The potentiometers 70, 71, 72 and resistors 74, 76 and 78 are preset to appropriate values to improve the linearity of the relation between the logarithm of the incident radiation intensity and the changes of E.H.T. voltage as measured on the differential meter circuit. The setting of these potentiometers 70, 71, 72 and adjustable resistors 74, 76, 78 is conveniently effected empirically with a calibration procedure. Whilst only three such by-pass circuits have been shown, more can be usefully employed and enable greater accuracy to be achieved.

The above-described radiation sensing device may be used in combination with a light source as a densitometer, e.g., for measuring the optical density of a photographic negative. The light source conveniently draws its power from the stabilized power supply source. Such a device is illustrated in FIG. 4 in which a stabilizer power supply source 90 feeds a light source 91 and the sensing device 92 which incorporates a photomultiplier tube 10. For use as a color analyzer, it may be provided with a set of filters 94 which are selectively movable into the path of the radiation incident upon the photomultiplier 10. For each different color filter, if the readings on the meter 65 (FIG. 2) are to be used directly, e.g., for determining processing times, then different off-set values will be required to allow for the standing current through the photomultiplier tube 10 and, as shown in FIG. 3, it is convenient to provide a plurality of adjustable current off-sets (corresponding to potentiometer 69 of FIG. 2) which are automatically switched into circuit in synchronism with the selective insertion of color filters into the radiation path.

Figure 3:
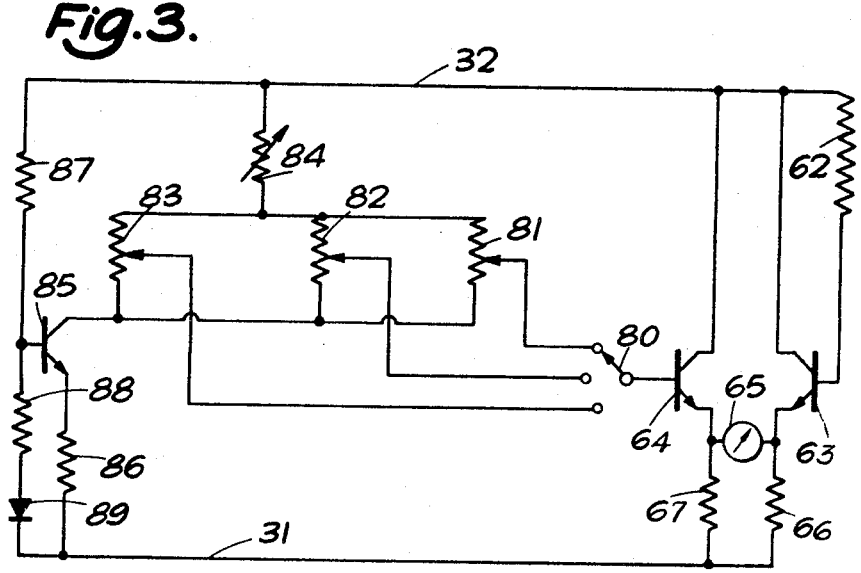
FIG. 3 is a circuit diagram illustrating a modification of part of the circuit of FIG. 2.

Referring to FIG. 3, there are shown the two transistors 63, 64 and meter 65. The voltage to be measured is applied to the base of transistor 63 by circuit means as shown in FIG. 2, only the measuring resistor 62 being shown in FIG. 3. The base of transistor 64 is connected by a selector switch 80 to a tap on any selected one of three adjustable potentiometers 81, 82 and 83. These three potentiometers, at one end, are connected in common via an adjustable resistor 84 to the positive supply line 32. At their other ends the three potentiometers are connected in common to the collector of a transistor 85, the emitter of which is connected via a resistor 86 to the earth line 31. The base of transistor 85 is connected via a resistor 87 to the line 32 and via a resistor 88 and diode 89 to line 31, so that the transistor acts as a constant current regulator for the potentiometers 81, 82 and 83. The three potentiometers can thus be set independently to adjust the zero settings for different colours irrespective of the setting of resistor 84 which provides an override control. This override control enables the instrument to operate as a null point indicator.

In a densitometer with a light source, the override control may be provided by a mechanical iris in the light path. However when the instrument is used as an "on easel" color analyser, the controls 81 to 83 may be set so that the meter reads null when the light from a reference negative and its printing filters is received. When the unknown negative is inserted in place of the reference negative, the overall light level on one of the colors needs to be adjusted to the reference null levels. In such an instrument, a mechanical iris would only give a limited amount of control. By use of the circuit shown in FIG. 3, the overall control is provided by resistor 84 which gives a wider range of control than a mechanical iris. The controls 81 to 83 provide a memory.

Although the embodiments described have a meter giving a visual indication, the output voltage may be applied to a recorder or may be used as an error signal for process control purposes.

I claim:

1. A radiation sensing device responsive to ultra-violet, visible or infra-red radiation comprising a photomultiplier tube having an anode, a cathode and dynodes with a bleeder resistor chain across the dynodes, an E.H.T. supply means applying an E.H.T. voltage between the anode and cathode and also across the bleeder resistor chain, said E.H.T. supply means including a step-up transformer and a rectifier, an oscillator unit supplying alternating current to the transformer, means responsive to the anode current of the photomultiplier tube arranged to control the amplitude of the output of the oscillator output unit so that the E.H.T. voltage is decreased as the anode current tends to increase so as to maintain the anode current substantially constant and indicator means responsive to the E.H.T. voltage.

2. A radiation sensing device as claimed in claim 1 wherein said means responsive to the anode current of the multiplier tube comprises a resistor in series with the anode and an amplifier responsive to the voltage across said resistor to provide a d.c. supply for the oscillator unit whereby the oscillator unit output voltage depends on the amplifier input.

3. A radiation sensing device as claimed in claim 2 wherein said oscillator unit comprises a multivibrator.

4. A radiation sensing device as claimed in claim 1 wherein said oscillator unit includes a power output stage coupled to the primary winding of said transformer.

5. A radiation sensing device as claimed in claim 1 wherein said indicator means comprises an indicator responsive to the voltage across a measuring resistor in a potential divider circuit including the dynode bleeder resistor chain.

6. A densitometer comprising a radiation sensing device as claimed in claim 1 in combination with a light source and a stabilized power supply providing power both for the oscillator unit and said light source.

7. A radiation sensing device responsive to ultra-violet visible or infra-red radiation comprising:
 a. a photomultiplier tube having an anode, a cathode and dynodes with a bleeder resistor chain across the dynodes,
 b. an E.H.T. supply means applying an E.H.T. voltage between the anode and cathode,
 c. said E.H.T. supply means including a step-up transformer and a rectifier, an oscillator unit supplying alternating current to the transformer and means responsive to the anode current of the photomultiplier tube arranged to control the amplitude of the output of the oscillator unit so that the E.H.T. voltage is decreased as the anode current tends to increase,
 d. a potential divider circuit including said bleeder resistor chain and a measuring resistor,
 e. said E.H.T. supply means applying E.H.T. voltage across said potential divider circuit,
 f. an indicator responsive to the voltage across said measuring resistor,
 g. at least two diodes, each with a series resistor, connected to separate adjustable potential sources, each diode being arranged to by-pass part of the current through said measuring resistor in the potential divider circuit when the potential across the measuring resistor reaches that of the adjustable potential source to improve the linearity of the relationship between the logarithm of intensity of incident radiation and indicated voltage,
 h. a further diode in said potential divider circuit between said measuring resistor and the by-pass circuits to correct for changes due to changes with temperature of said diodes in the by-pass circuits.

8. A radiation sensing device responsive to ultra-violet, visible or infra-red radiation comprising:
 a. a photomultiplier tube having an anode, a cathode and dynodes with a bleeder resistor chain across the dynodes,
 b. an E.H.T. supply means applying an E.H.T. voltage between the anode and cathode,
 c. said E.H.T. supply means including a step-up transformer and a rectifier, an oscillator unit supplying alternating current to the transformer and means responsive to the anode current of the photomultiplier tube arranged to control the amplitude of the output of the oscillator unit so that the E.H.T. voltage is decreased as the anode current tends to increase,
 d. a potential divider circuit including said bleeder resistor chain and a measuring resistor,
 e. said E.H.T. supply means applying E.H.T. voltage across said potential divider circuit, and
 f. a differential voltage indicator with an adjustable potential input and responsive to the difference between the voltage across said measuring resistor and that of said adjustable potential input.

9. A radiation sensing device as claimed in claim 8 wherein there are provided a plurality of adjustable potential sources with switch means for connecting any selected one of said adjustable potential sources to said adjustable potential input of the differential voltage measuring indicator.

10. A radiation sensing device as claimed in claim 9 wherein said plurality of adjustable potential sources comprises a plurality of adjustable potentiometers connected in shunt in a constant current circuit, which constant current circuit also includes an adjustable resistor forming an override control operative irrespective of the setting of said switch means.

11. A color analyser comprising a radiation sensing device as claimed in claim 9 in combination with a plurality of color filters selectively movable into the radiation path with means for synchronizing the operation of the switch with the selection of the color filter.

* * * * *